United States Patent Office 2,846,350
Patented Aug. 5, 1958

2,846,350
FUROYL DITHIOCARBAMATES

Robert A. Braun, Glenside, and W E Craig and Chien-Pen Lo, Philadelphia, Pa., assignors to Rohm & Haas Company, Philadelphia, Pa., a corporation of Delaware No Drawing. Application February 29, 1956
Serial No. 568,445

7 Claims. (Cl. 167—33)

This invention concerns furoyl dialkyldithiocarbamates in which the alkyl group contains not over four carbon atoms and difuroyl ethylene bisdithiocarbamate and the application of these compounds to plants for protection against pathogenic fungi.

Various acyl dithiocarbamates have been suggested. In general these are unstable, particularly to heat. None of the known acyl dithiocarbamates has been indicated to possess fungicidal properties and those which contain stabilizing groups, we find, are generally lacking in fungicidal activity. It was, therefore, an unexpected development to find some acyl dithiocarbamates which possess sufficient stability to permit their preparation, storage, compounding, and use and which exhibit marked fungitoxic properties.

To prepare the furoyl dithiocarbamates of this invention furoyl chloride or bromide is reacted with a salt, particularly a soluble salt of a lower dialkyldithiocarbamic acid or of ethylenebisdithiocarbamic acid. This reaction is desirably carried out below about 30° C. and usually between —5° and 20° C. The reaction may be performed in an organic solvent, such as acetone or dimethylformamide, or in water, or in a mixture of solvents. The salt formed is separated, as by filtering from an organic solvent, by washing the reaction mixture with water or by taking up the desired product in a water-immiscible solvent when it is made in a water system. The product may be used as obtained or may be purified, as by recrystallization.

The dithiocarbamates used as starting materials include sodium dimethyldithiocarbamate, sodium diethyldithiocarbamate, potassium dipropyldithiocarbamate, potassium dibutyldithiocarbamate, disodium ethylene bisdithiocarbamate, magnesium ethylene bisdithiocarbamate, dipotassium ethylene bisdithiocarbamate, and the like. We have also studied the reaction with salts of the dithiocarbamic acid derived from morpholine and piperidine and found that the acyl derivatives, including the furoyl, are highly unstable, if they are formed at all.

Additional details of the preparation of the compounds of this invention are presented in the following examples, which are given for purposes of illustration and not by way of limitation. Parts therein are by weight.

Example 1

Furoyl chloride (65.3 parts) was slowly added to a solution containing sodium dimethyldithiocarbamate (71.5 parts) and dimethylformamide (250 parts) with stirring and cooling below 15° C. The mixture was stirred for two hours with the temperature kept below 25° C. Water (500 parts) was added. The yellow solid which separated was collected, washed with water, and air dried. There was thus obtained 85.6 parts of furoyl dimethyldithiocarbamate (having a structural formula of

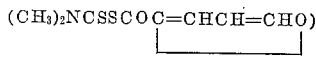

which had a melting point of 68°–69° C.

Analysis.—Calculated for $C_8H_9NO_2S_2$: N, 6.5; S, 29.8. Found: N, 6.5; S, 26.9.

In standard fungitoxicity tests on slides furoyl dimethyldithiocarbamate had an $LD_{50}$ value of 2.5–5 p. p. m. against Stemphylium sarcinaeforme. In the tenacity test, it gave 99% inhibition of germination of spores of Stemphylium sarcinaeforme when applied at the rate of one pound per 100 gallons of spray even after 32 minutes of washing.

Example 2

Furoyl chloride (52.2 parts) was slowly added to a mixture of solid sodium ethylenebisdithiocarbamate hexahydrate (73.2 parts) and acetone (200 parts) with stirring and cooling, the temperature being kept below 20° C. The mixture was then stirred at room temperature for an hour. The solid was collected, washed with water, and dried in the air. There was obtained 74 parts of difuroyl ethylenebisdithiocarbamate (having a structural formula of

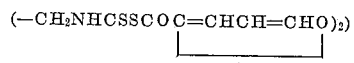

as a colorless solid which had a melting point of 114°–116° C.

Analysis.—Calculated for $C_{14}H_{12}N_2O_4S_4$: N, 7.0; S, 32.0. Found: N, 7.5; S, 32.4.

Furoyl ethylenebisdithiocarbamate in standard fungitoxicity tests had an $LD_{50}$ value of 1–5 p. p. m. against both Stemphylium sarcinaeforme and Monilinia fructicola. In the tenacity test, it gave 96% inhibition of germination of spores of Stemphylium sarcinaeforme when applied at the rate of 1/32 pound per 100 gallons even after 32 minutes of washing and 100% inhibition of germination of spores of Monilinia fructicola when applied at the rate of 1/16 pound per 100 gallons even after 32 minutes of washing.

Example 3

Furoyl chloride (13 parts) was slowly added to a mixture of solid sodium diisopropyldithiocarbamate (25 parts) and acetone (130 parts) with stirring and cooling, the temperature being kept below 10° C. The mixture was stirred overnight and poured into water (200 parts). The oil which formed was taken up in benzene, washed with water, and dried over calcium sulfate. After removal of the solvent, the residual oil solidified on standing. The solid was recrystallized from petroleum ether to give 12 parts of furoyl diisopropyldithiocarbamate (having a structural formula of

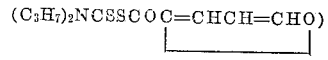

which melted at 73°–75° C.

Analysis.—Calculated for $C_{12}H_{17}NO_2S_2$: N, 5.2; S, 23.6. Found: N, 5.1; S, 22.5.

In standard fungitoxicity tests on slides furoyl diisoporpylidithiocarbamate at 1000 p. p. m. gave 79% inhibition against Stemphylium sarcinaeforme and 100% inhibition against Monilinia fructicola.

Example 4

In a similar manner, furoyl chloride was reacted with sodium piperidinecarbodithioate. The product was a solid which melted at 65°–68° C. and contained no sulfur. It was probably the N-furoylpiperidine.

Analysis.—Calculated for $C_{10}H_{13}NO_2$: N, 7.8. Found: N, 7.6.

Example 5

In a similar reaction of furoyl chloride with sodium 4-morpholinecarbodithioate, no identifiable product was obtained.

All of the above compounds were applied in aqueous 1% sprays to tomato plants. There was no evidence of phytotoxicity.

By the above methods there may be used furoyl bromide in place of an equivalent weight of the chloride used above. In place of the sodium salts there may be used other water soluble salts, the proportions then being adjusted for differences in molecular weights. In place of the dimethyldithiocarbamates or diisopropyldithiocarbamates there may be used the diethyldithiocarbamates or the dibutyldithiocarbamates. In each case the products exhibit fungicidal action, decreasing somewhat as molecular weights are increased.

The various furoyl derivatives are all fungicidal although not, of course, identical in their effectiveness and action. Furoyl ethylenebisdithiocarbamate has a somewhat different spectrum of effectiveness against different fungi than the furoyl dialkyldithiocarbamates and, as is shown above, has excellent tenacity.

The furoyl dialkyldithiocarbamates and difuroyl ethylenebisdithiocarbamate are useful in combatting pathogenic fungi which attack plants. For this purpose they are applied to plants or their environment in sprays or dusts, in which they are extended with a carrier or diluent.

One or more of these compounds may be taken up in one or more finely divided inert solids. The compound may be ground into the solid or spread thereon from a solution in a volatile solvent. Dispersing agents and/or sticking agents may be incorporated in the mixture. Concentrations of active compound in dusts usually vary from 1% to 10%, although higher concentrations may be used.

A typical formulation comprises five parts of furoyl dimethyldithiocarbamate, one part of condensed naphthaleneformaldehyde sodium sulfonate, 80 parts of kaolin, and 14 parts of diatomaceous earth. Other inert diluents such as talc, pyrophillite, silica, and other kinds of clays may be used as solid diluents.

If a few percent of a wetting agent is also used in a solid mixture such as shown above, there becomes available a wettable powder which can be diluted with water and applied from an aqueous spray. In wettable powders it is usually desirable to increase the proportion of the active fungicidal agent. A typical formulation consists of 25 parts of difuroyl ethylenebisdithiocarbamate, 70 parts of a finely particled Georgia clay, two parts of a lignin sulfonate and three parts of an octylphenoxypolyethoxyethanol wetting agent.

A typical emulsion concentrate is prepared by dissolving 20 parts of furoyl dimethyldithiocarbamate in 75 parts of xylene and adding one part of calcium dodecylbenzene sulfonate and four parts of tert-octylphenoxypolyethoxyethanol wetting agent. This preparation is convenient for storing and handling this fungicidal agent and requires only extension in water to provide an effective spray.

In standard assays for determining the inhibiting effect against various types of organisms it was found that difuroyl dimethyldithiocarbamate applied at 1000 p. p. m. to a cloth disc which was then placed on agar inoculated with a test organism as the spores of an organism produced a zone of inhibition of 57 mm. diameter in 24 hours and this compound at 100 p. p. m. produced a zone of inhibition of 15 mm. in diameter in 24 hours against round yeast. Against marbling bacterium it produced a zone of inhibition of 51.5 mm. in 24 hours, also 1000 p. p. m. and at 100 p. p. m. it produced a zone of 15.5 mm. in 24 hours. These are exceptionally large zones of inhibition in this type of test.

The sprays or dusts may be applied to foliage stems, fruit, seeds, root systems, or other plant organs or to their environment, as is almost essential for treating the underground portions of plants. Dusts, as already indicated, usually contain about 1% to 10% of one or a mixture of the compounds of this invention in a solid carrier. The sprays are made by extending with water a wettable powder or emulsifiable concentrate or a solution in a water-miscible solvent, such as acetone. The active agent is then applied at a concentration usually from about a half pound to two pounds per 100 gallons of spray.

The compounds of this invention may be used against a wide variety of plant fungi. They are useful in combatting early and late blight of tomatoes and potatoes. They may be used for protecting peaches against rots. They are effective against rusts, such as rusts of beans, rye, and snapdragon.

The compounds of this invention may be used as the sole pesticidal agents in a dust or spray or they may be used in conjunction with other fungicides or with insecticides, miticides, and comparable pesticides.

We claim:

1. A compound from the class consisting of difuroyl ethylenebisdithiocarbamate and furoyl dialkyldithiocarbamates in which the alkyl group contains not over four carbon atoms.

2. Difuroyl ethylenebisdithiocarbamate having the structure

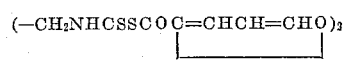

3. Furoyl dimethyldithiocarbamate having the structure

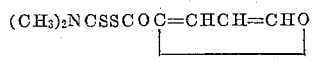

4. Furoyl diethyldithiocarbamate having the structure

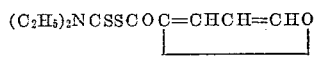

5. A process for controlling fungi on living plants which comprises supplying to their environment a compound from the class consisting of difuroyl ethylenebisdithiocarbamate and furoyl dialkylthiocarbamates in which the alkyl group contains not over four carbon atoms.

6. A process for controlling fungi on living plants which comprises applying thereto a composition containing difuroyl ethylenebisdithiocarbamate.

7. A process for controlling fungi on living plants which comprises applying thereto a composition containing furoyl dimethyldithiocarbamate.

References Cited in the file of this patent

UNITED STATES PATENTS

| | | |
|---|---|---|
| 1,972,961 | Tisdale | Sept. 11, 1934 |
| 2,045,275 | Leaper | June 23, 1936 |
| 2,084,038 | Lichty | June 15, 1937 |
| 2,193,774 | Sloan | Mar. 12, 1940 |